United States Patent
Held

[15] 3,691,898
[45] Sept. 19, 1972

[54] EDGE BURR REMOVAL APPARATUS

[72] Inventor: Kurt Held, 7201 Schura Uber, Tuttlingen, Germany

[22] Filed: April 2, 1970

[21] Appl. No.: 29,345

[30] Foreign Application Priority Data

April 3, 1969 Germany..........P 19 17 212.4

[52] U.S. Cl.......................90/11 R, 90/18, 90/24 D, 51/5
[51] Int. Cl................................................B23c 3/12
[58] Field of Search ...90/11 R, 18, 24 A, 24 D, 24 F; 51/248, 5; 83/3

[56] References Cited
UNITED STATES PATENTS 2,766,566  10/1956  Gage..........................51/248
3,125,934  3/1964  Persson........................90/18
3,191,500  6/1965  Schuster.......................90/11

Primary Examiner—Gil Weidenfeld
Attorney—Michael S. Striker

[57] ABSTRACT

During grinding of a chamfer on a continuously transported workpiece, an edge with a burr is formed. The burr moves with the workpiece into eccentric engagement with a cutter which is rotated and continuously severs the burr from the edge.

13 Claims, 2 Drawing Figures

EDGE BURR REMOVAL APPARATUS

BACKGROUND OF THE INVENTION

The present invention relates to apparatus for removing the burr which is formed on the edge of a chamfer by means of a cutter pressed against the workpiece. Trimming and chamfering machines are known by which on prismatic workpieces consisting of steel, iron, alloys, or synthetic material, edges are chamfered in order to obtain a more pleasing appearance of the workpiece, and to eliminate the danger of injuries by the sharp edge of a workpiece. Usually, two faces extending perpendicular to each other form an edge, which is chamfered. However, it is also possible to chamfer edges which are not formed by perpendicular faces.

A chamfer replacing an edge is, for example, obtained by transporting the workpiece at the proper distance over a rotary grinding disc or milling cutter. The axis of rotation of grinding disc or milling cutter can be parallel, or inclined up to an angle of 90°, to the guide faces along which the workpiece is transported, so that the grinding disc or milling cutter works either with its axial end face or peripheral circular face. Due to the rotary motion of the chamfering tool, a burr is formed along one edge of the chamfer whose size depends on several factors, such as the material of the workpiece, the graining, bonding, and number of rotations of the grinding disc, the transporting speed of the workpiece, and the rotary speed of the chamfering tool. It is necessary to remove the burr before the workpiece can be used.

In accordance with the prior art, the burr is removed by a manual operation using an abrasive substance, a file, or a scraper blade. It has also been proposed to remove the burr during the same transporting operation of the workpiece during which the burr was formed by the chamfering tool. In one apparatus of the prior art, the grinding disc has two zones of different coarseness, and the final zone is provided for finishing the edge so that no burr is formed. However, a small burr is nevertheless formed.

In another apparatus of the prior art, a scraper-like cutting knife follows the chamfering grinding disc, and is pressed by a spring against the workpiece so that during the transport of the workpiece, the burr is cut off. However, this operation is effective only if the scraper knife is very sharp, since otherwise the burr is only folded over. Another disadvantage is that the scraper knife cuts slightly into the material of the workpiece so that the workpiece surface is damaged, and the transport of the workpiece, which is usually manually carried out, is blocked, at least temporarily.

In another apparatus of the prior art, a knife is vibrated in the direction of the transporting movement of the workpiece, and abuts the same for removing the burr. Due to the fact that always the same portion of the knife is in contact with the burr, the knife becomes dull very quickly requiring interruption of the continuous operations.

SUMMARY OF THE INVENTION

It is one object of the invention to overcome the disadvantages of known apparatus for removing a burr from the edge of the workpiece, and to provide a continuously operating, reliable apparatus for removing burrs.

Another object of the invention is to provide a rotary cutter for removing a burr so that during rotation of the cutter, different portions of its cutting edge are operative.

Another object of the invention is to provide apparatus in which a chamfer resulting in a burr, and the severing of the burr are continuously made.

Another object of the invention is to provide an apparatus for removing burrs in which the workpiece is manually advanced during the burr forming and burr removing operations.

With these objects in view, the present invention is concerned with a burr removing apparatus in which a rotary cutter is used which rolls along the edge of a chamfer during transporting movement of the workpiece so that a burr on the edge is removed.

It is possible to provide a drive for the rotary cutter, but in the preferred embodiment of the invention, the burr engages the circular cutting edge of the cutter eccentric to the axis of rotation of the same so that the shearing forces caused by the advancing force acting on the workpiece produce a turning moment by which the cutter is rotated as the workpiece is transported. Due to this arrangement, different portions of the circular cutting edge of the cutter move to the operative position engaging the burr, resulting in uniform wear of the cutting edge along the entire circumference of the cutter, whereby the span of life of the cutter is substantially extended as compared with cutters according to the prior art in which only one point of the cutting edge is in engagement with the burr, cutting the same.

Due to the fact that in accordance with the present invention, the cutter rolls along the edge on which the burr is formed, the danger is eliminated that the burr is folded over, instead of being severed from the edge. The rotating cutter pushes the burr laterally away, and produces a clean cut, even if a continuous chip or shaving is formed.

The rotary cutter of the invention cannot cut into the edge and be blocked by the same, since the cutter is rotated by the shearing resistance, when an edge portion thereof tends to cut into the edge. As a result, it is easily possible to transport the workpiece manual by without interruption so that the chamfer is formed, and the resulting burr removed in a continuous operation.

It is preferred to construct the rotary cutter of steel or any other hard, wear-resistant metal. In a preferred embodiment of the invention, only the cutting portion of the cutter is formed by a hard metal disc provided with a circular cutting edge.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
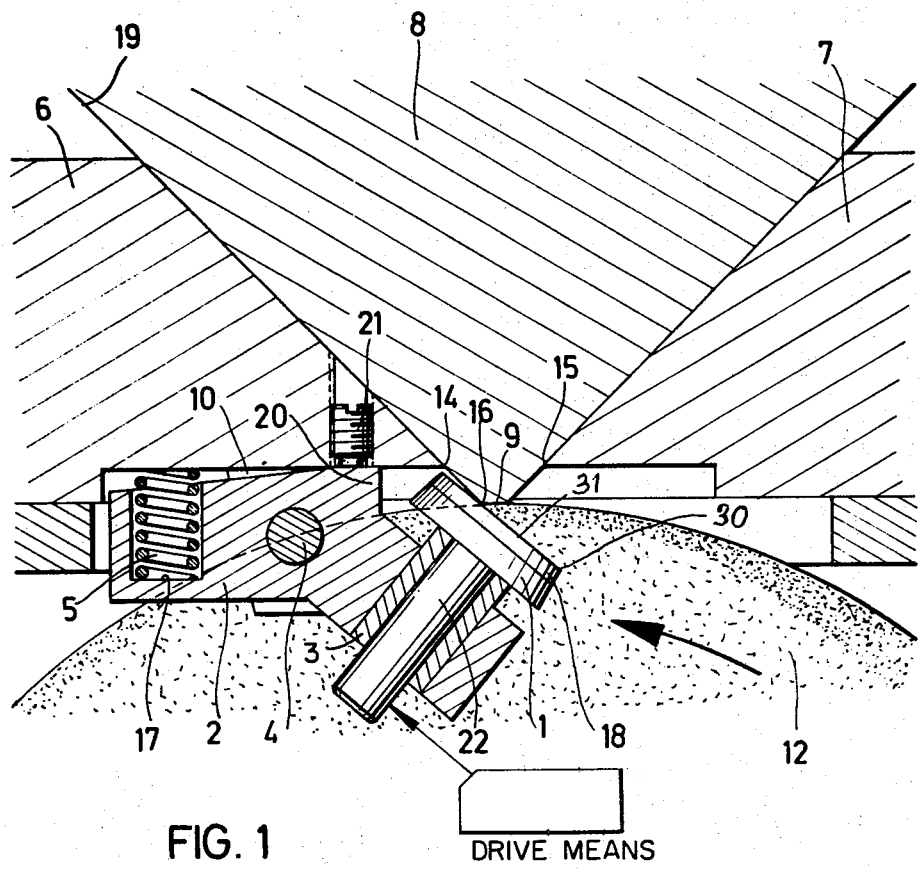
FIG. 1 is a fragmentary sectional view illustrating an embodiment of the invention.

A workpiece 8 has two lateral faces 19 extending perpendicularly to each other, and being guided by a pair of guide members 6 and 7 having corresponding abutment faces to move in one direction. The workpiece 8 is preferably manually advanced in its longitudinal direction, and the edge formed by the lateral faces 19, is chamfered by a rotary grinding wheel 12 which moves in the direction of the arrow so that on one side of the chamfer 9, where the same forms an edge 16 with the lateral face 19, a projecting burr 13 is continuously formed due to the fact that the rotating grinding wheel 12 displaces the material taken off the workpiece in one direction.

A circular cutter 1 has a cutting head of frustoconical configuration, the outer part of which is formed by a thin circular disc 18 consisting of a wear-resistant metal, such as steel, and having a circular peripheral cutting edge 30 surrounding an end face 31 which is either planar or slightly concave to provide a sharper circular cutting edge 30. The frustoconical surface of revolution 34 intersects with end face 31 at the cutting edge 30.

Cutter 1 also has a journal portion 22 mounted for turning movement in a bushing 3 which is fixedly secured, for example pressed, into a bore of a double-armed carrier lever 2 which is mounted on a shaft 4 for pivotal movement. Shaft 4 has end portions respectively projecting into blocks 10 and 11, secured by screws to a guide 6; and forming a stationary support.

A spring 5 is provided in a cylindrical recess 17 of carrier lever 2, and abuts the bottom face of guide member 6 so that cutter 1, turning about the axis of shaft 4, abuts the edge 16 of workpiece 8.

It is preferred that the axis of shaft 4 is parallel to the transporting direction of the workpiece 8, which is also the longitudinal direction of the edge 16, but it is possible to place blocks 10 and 11 in a position in which the axis of angular movement of carrier lever 2 forms an acute angle with the direction of movement of workpiece 8.

Figure 2:
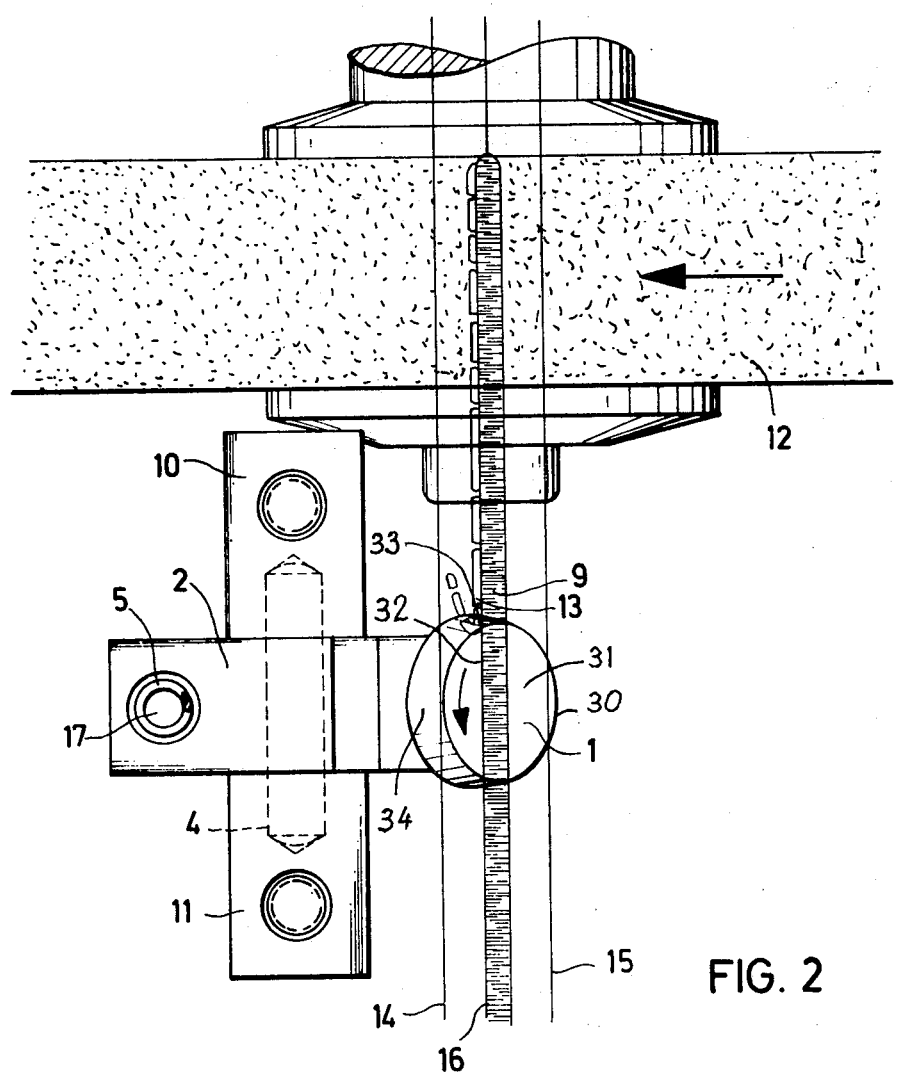
FIG. 2 is a fragmentary schematic plan view of the embodiment of FIG. 1 in which of the workpiece, only the chamfer is shown.

FIG. 2 is schematic, and shows only the newly formed chamfer 9 on workpiece 8, and the edges 14 and 15 of the lateral guide members 6 and 7.

The cutter 1 can also be mounted for rotation in a slide, not shown, which is movable on the stationary support toward and away from the workpiece 8, and guided on rails, or in a conventional guideway.

Guide member 6 has a vertical threaded bore into which a worm screw 21 is threaded. Worm screw 21 forms a stop against which the stop portion 20 of carrier lever abuts due to the action of spring 5. The position of the worm screw stop 21 is adjusted until carrier lever 2 assumes a position in which the cutter 1 is in a cutting position in which it projects about 0.1 mm beyond the plane of the lateral face 19 of workpiece 8. The bearing blocks 10 and 11 are secured to the guide member 6 in a position in which the edge 16 intersects at two points with the circular cutting edge of cutting portion 18 of cutter 1.

During operation of the apparatus, a workpiece 8 is placed before the grinding wheel 12 on the guide members 6 and 7, and is manually advanced in one direction along the abrasive surface of the rotating grinding wheel 12 while sliding on the inner faces of the guide members 6 and 7. When the edge of workpiece 8 engages the surface of grinding wheel 12, a chamfer is ground, while at the same time, the burr 13 is formed along the edge 16 between the chamfer 9 and the lateral face 19 of the workpiece transversely projecting from edge 16. Since the surface of the grinding wheel 12 moves in the direction of the arrow, the burr 13 is formed only on one of the two longitudinal edges of chamfer 9, as best seen in FIG. 2.

When the transporting movement of the workpiece 8 is continued, the leading portion of the burr 13 engages a point 33 of the circular cutting edge of the rotary cutter 1, which is held by the action of spring 5 in a cutting position in abutting contact with edge 16 of one lateral surface 19.

While it is possible to provide drive means, schematically shown in FIG. 1, for rotating the cutter 1, in the preferred embodiment illustrated in the drawing, the edge 16 extends along a chord 32 of the circular end face of cutter 1, eccentric to, and radially spaced from, the axis of rotation of the same, as shown in FIG. 2 so that the pressure of the manually advanced workpiece acts through the leading end of the burr 13 on the engaged point of the circular cutting edge 30 and provides a force eccentric to the center of the circular cutting edge 30, causing a turning moment to act on cutter 1 to turn the same in the direction of the arrow shown in FIG. 2. The circular cutting edge of the rotating cutter cuts into the portion of the burr adjacent edge 16, while the cutter continuously rotates. In this manner, successive peripheral portions of the circular cutting edge engage the burr so that the cutting edge is uniformly worn, while at the same time the rotation of the cutting head causes a lateral deflection of burr 13 as shown in FIG. 2 so that the cut-off shaving is deflected by the surface of revolution surrounding cutter 1, which is preferably a conical surface.

During the shearing off of the burr, the lateral face 19 provides one shearing edge, and the cutting edge of cutter 1 provides the second shearing edge.

It is, of course, necessary to move the entire length of the workpiece 8 past the cutter 1 so that the burr is removed when the trailing end of the workpiece 8 has passed the grinding wheel 12.

It will be understood that each of the elements described above, or two or more together, may also find a useful application in other types of burr removal apparatus differing from the types described above.

While the invention has been illustrated and described as embodied in a rotary cutter for severing a burr along the edge of a chamfer of a continuously moving workpiece, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

I claim:

1. Edge burr removal apparatus comprising, in combination, supporting means including guide means for guiding in one direction a workpiece having intersecting faces forming an edge extending in said direction and having a burr transversely projecting from said edge; and a cutter mounted on said supporting means for rotation about an axis transverse to said edge, and having a peripheral surface of revolution and an end face intersecting at a circular cutting edge concentric with said axis, said supporting means including means for positioning said cutter relative to said guide means so that the cutter end face is crossed by the edge of the said workpiece.

2. Apparatus as claimed in claim 1 comprising rotary means for making a chamfer on said workpiece during movement of said workpiece in said one direction whereby said edge with said burr thereon is formed on one side of said chamfer directly before said workpiece engages said cutter.

3. Apparatus as claimed in claim 1 wherein said supporting means include a stationary support, and said positioning means include a carrier means supporting said cutter for rotation about said axis, and being mounted on said support for movement toward and away from said workpiece for moving said cutter to and from a cutting position.

4. Apparatus as claimed in claim 3 comprising spring means for biassing said carrier means toward said workpiece; and wherein said cutter is biassed by said spring means to abut in said cutting position said edge of said workpiece.

5. Apparatus as claimed in claim 3 wherein said carrier means includes a lever supporting said cutter at one end thereof, and being mounted on said support for angular movement about an axis.

6. Apparatus as claimed in claim 5 wherein said support includes means for mounting said lever for angular movement about an axis parallel with said one direction; and wherein said edge is straight.

7. Apparatus as claimed in claim 5 wherein said support includes means for mounting said lever for angular movement about an axis defining an acute angle with said one direction; and wherein said edge is straight.

8. Apparatus as claimed in claim 3 and wherein said support includes adjustable means for holding said carrier means in such a position that said cutting edge in said cutting position projects only slightly beyond the plane of a face of said workpiece.

9. Apparatus as claimed in claim 1 wherein said cutter has a support portion mounted on said supporting means for rotary movement about said axis, and a cutting portion secured to said support portion, and including a hard, wear resistant material.

10. Apparatus as claimed in claim 9 wherein said cutting portion is a thin circular disk having a circular peripheral cutting edge; and wherein said support portion of said cutter has said surface of revolution adjacent the periphery of said disk and having the same diameter as the same.

11. Apparatus as claimed in claim 1 wherein said end face is planar and surrounded by said cutting edge.

12. Apparatus as claimed in claim 1 wherein said end face is concave and surrounded by said cutting edge.

13. Apparatus as claimed in claim 1 comprising drive means for rotating said cutter about said axis so that said cutter is rotated independently of the movement of said workpiece in said one direction.

* * * * *